Figure 1:
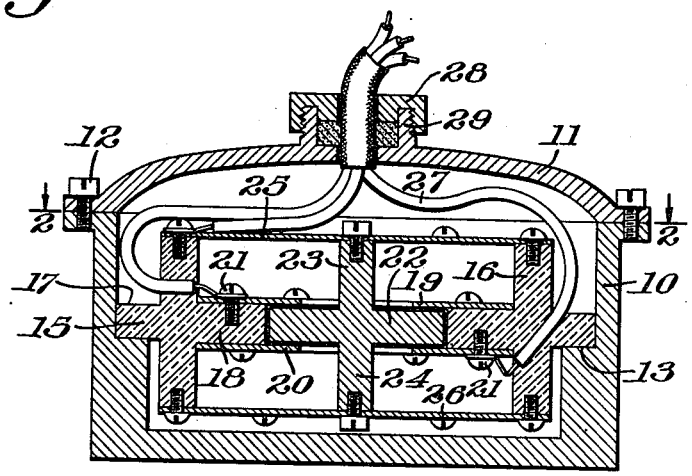

July 23, 1935.   H. C. HAYES   2,008,713
SOUND DETECTING APPARATUS
Original Filed May 27, 1931   2 Sheets-Sheet 1

HARVEY C. HAYES
INVENTOR

BY
HIS ATTORNEY

Patented July 23, 1935

2,008,713

UNITED STATES PATENT OFFICE 2,008,713

SOUND DETECTING APPARATUS

Harvey C. Hayes, Washington, D. C.

Original application May 27, 1931, Serial No. 540,483. Divided and this application July 29, 1932, Serial No. 626,089

5 Claims. (Cl. 177—352)

(Granted under the act of March 3, 1883, as amended April 30, 1928; 370 O. G. 757)

My invention relates to apparatus for detecting vibrations and more particularly to apparatus for detecting vibrations caused by sound or compressional waves traveling through the air or some solid medium such as the earth.

This is a division of my copending patent application, Serial No. 540,483, entitled "Sound detecting apparatus" which was filed May 27, 1931.

Heretofore sound detecting apparatus designed for the above purpose has either been constructed along the principles of the microphone or has involved some type of magneto electric construction; that is, one in which a variation of magnetic flux cutting across a coil or similar conductor is made to induce a current therein in response to a vibration caused by the passage of compressional or sound waves through the medium. The difficulty with devices of this character in the past has been that the electrical effects produced by virtue of the sound or other compressional waves striking the detector have been quite feeble and have required considerable amplification before being transmitted to a suitable indicating or recording apparatus such as a galvanometer or an oscillograph. While suitable amplifying units embodying multi-stage vacuum tube amplifiers have been available for this purpose, these units have been subject to the atmospheric disturbances commonly known as static, and at certain seasons of the year this static effect has been so great as to render the detectors completely useless. This is for the reason that the amplifying units have served to amplify the static effects in the same ratio that the impulses set up by the detector have been amplified.

A primary object of the present invention has been to devise sound detecting apparatus which is free from the interferences of such static conditions and which is sensitive to extremely weak vibrations. Another object of the invention has been to devise sound or vibration detecting apparatus which involves a minimum number of elements. To these ends the present invention contemplates the creation of a sufficiently large electrical disturbance upon the operation of the detector itself as to make it possible to dispense with all or most of the amplification. The electrical apparatus necessary in carrying out the invention is much lighter, simpler, cheaper and more stable than is the ordinary multi-stage amplifier. Furthermore, the invention lends itself particularly well to the detection of low frequency vibrations such as are met with in geophysical exploration work.

In accordance with my invention I have provided apparatus wherein extremely slight vibrations in a medium such as the earth, tend to cause a differential change in frequency in two oscillating tube circuits having normally the same frequency and coupled to a single detector tube, so that the detector tube will show an indication of the vibrations through this change in frequency or unbalancing of the two oscillating circuits.

In further carrying out my invention, I have provided an electrostatic sound detecting device connected in one or both of the oscillating tube circuits and directly responsive to vibrations caused by sound waves or other waves of a like nature.

Figure 2:
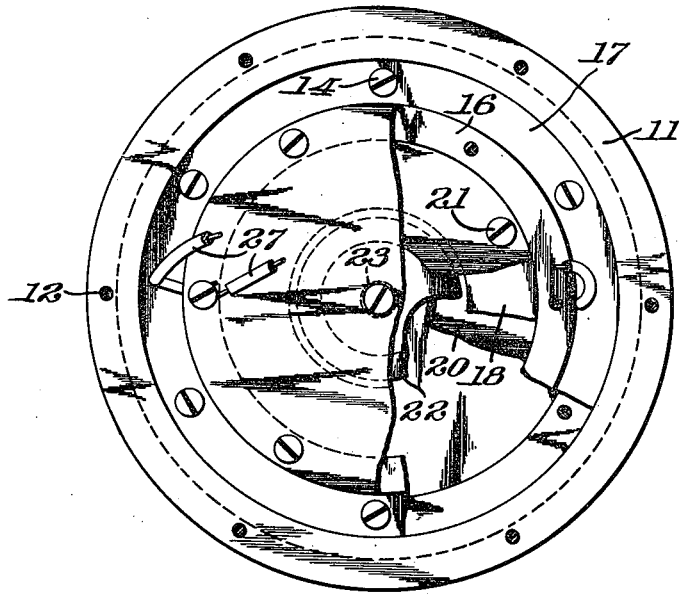
Figure 3:
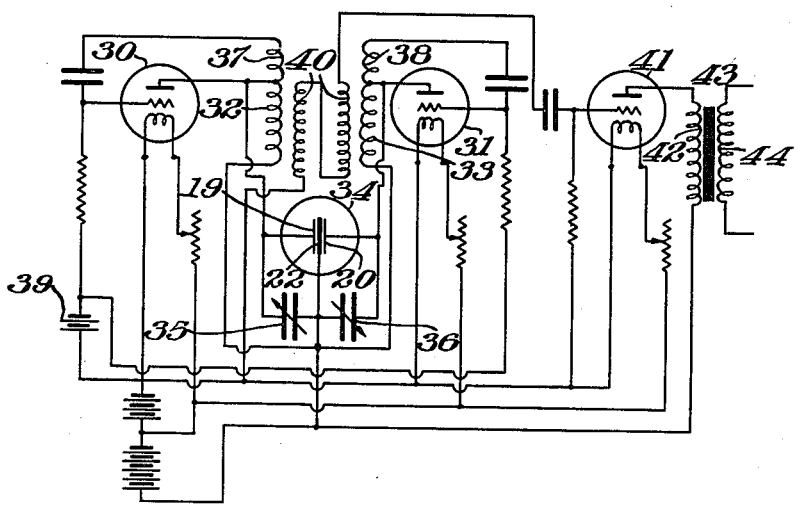
Figure 4:
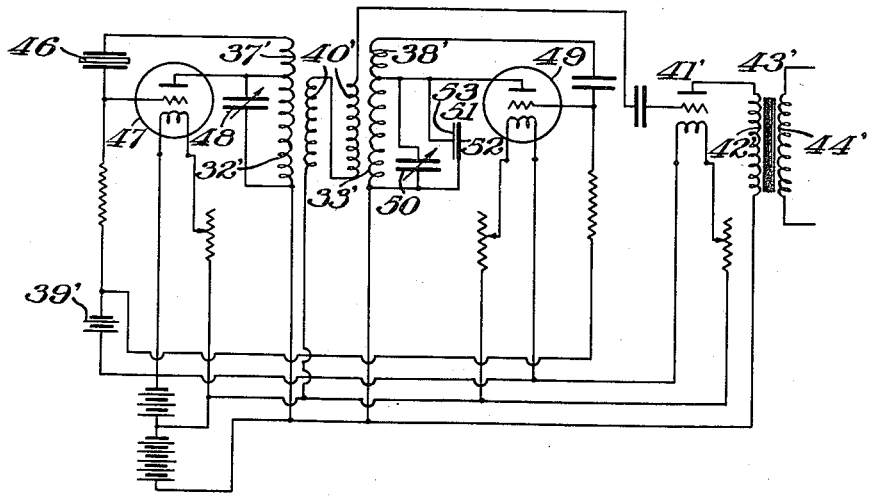

For a more complete understanding of my invention reference may be had to the accompanying drawings, wherein Fig. 1 is a sectional elevation of an electrostatic sound detecting device embodying one form of my invention; Fig. 2 is a plan view taken on line 2—2 of Fig. 1, part of the detector being broken away to more clearly illustrate the construction thereof; Fig. 3 is a schematic wiring diagram of my apparatus, while Fig. 4 is a wiring diagram of a modified form of my invention.

Referring to the drawings and more particularly to Figs. 1 and 2 of the drawings, I have provided a casing 10 adapted to be buried or otherwise anchored in the ground so that it will be responsive to slight movements or vibrations of the ground, such for instance as those which might be produced by the passage through the ground of sound or compressional waves of a like nature. The casing is provided with a cover member 11, securely attached to the casing 10 by suitable screws 12. A ledge 13 is formed on the inner surface of the casing and to this ledge is rigidly secured by means of suitable screws 14 an annular block 15 of electrically insulating material. The annular block 15 comprises a cylindrical portion 16 and outer and inner radially extending flanges 17 and 18 respectively, the screws 14 passing through the outer flange 17. To opposite sides of the inner radial flange 18 of the insulating block 15 are secured a pair of ring-shaped metallic plates 19 and 20 by means of suitable screws 21. It will be observed that the metallic plates 19 and 20 are insulated from each other and also that they are parallel throughout their entire surfaces. These ring-shaped plates 19 and 20 form the fixed plates of a pair of variable condensers, as will be described more clearly hereinafter. A metallic, disc-shaped inertia member 22 having hub-like projections 23 and 24 is resiliently suspended between a pair of flexible metallic discs 25 and 26 and these discs are in turn secured around their circumferences to the cylindrical portion 16 of the insulating block 15. The disc-shaped inertia member 22 when suspended between the diaphragms 25 and 26 is positioned between the ring-shaped plates 19 and 20 so that the distance between the inertia member and the plate 19 will normally be the same as the distance between the inertia member and the plate 20. It will be observed that two electrical condensers are thus formed, one condenser comprising the inertia disc 22 and the ring-shaped plate 19, while the other condenser comprises the inertia disc 22 and the ring-shaped plate 20. Electrical connecting leads 27 are secured to each of the ring-shaped plates 19 and 20 and to the inertia member 22 through the diaphragm 25. These connecting leads pass outwardly from the casing through a stuffing box 28 provided with a suitable packing 29.

It will now be seen that if the inertia disc 22 is properly centered between the plates 19 and 20 in a vertical direction, the two condensers will have substantially equal capacity. If the casing 10 is moved up and down, for instance by sound vibrations or otherwise, the inertia disc 22 will tend to remain stationary and the capacity of the two condensers will vary because of the variation in the length of the air gaps between the inertia disc and the condenser plates 19 and 20, and it is obvious that the two condensers always change capacity in opposite directions, one increasing as the other decreases. These capacity changes will be produced by a passing seismic wave when the casing 10 is buried or otherwise anchored to the ground.

Suppose now that one condenser forms a part of the capacity of an oscillating tube circuit and the other condenser forms a part of a second similar oscillating tube circuit, and suppose these two circuits are arranged through an inductive or other type of coupling to feed through a common detector tube. The output from this detector tube will reproduce the beats between the two circuits and if, in an undisturbed state, the two oscillatory circuits are of equal frequency, the output from the detector tube will show no beats. However any sound disturbance striking the sound detector will cause the casing 10 to move or vibrate slightly and the relative capacity of the two condensers will be changed, thus making the frequencies of the two oscillatory circuits differ and producing beats in the detector tube circuit, the frequency of which, or rather the change of frequency of which will be a measure of the intensity of the sound waves. The beats can be heard by connecting a phone in the detector tube plate circuit either directly or indirectly or they can be registered or recorded by substituting a sensitive galvanometer for the phone.

In Fig. 3 I have illustrated a schematic diagram showing the use of my sound detector. Two individual oscillating tube circuits are provided, these circuits containing respectively the tubes 30 and 31, and in the plate circuits of the tubes the inductances 32 and 33. The sound detector illustrated in Fig. 1 and 2 is represented in Fig. 3 by the circle 34 within which the inertia disc 22 is schematically illustrated as being located between the ring-shaped plates 19 and 20. The oscillating tube circuit at the left contains condenser 19—22 and the oscillating tube circuit at the right contains the condenser 20—22 and since, under normal conditions, the inductance 32 is equal to the inductance 33 and the condenser 19—22 has the same capacity as the condenser 20—22, the two oscillating tube circuits will have equal frequencies. In order to take care of any inaccuracy which might obtain, for instance in the positioning of the inertia disc 22 between the condenser plates 19 and 20, I have provided two small variable condensers 35 and 36, the rotors of which are preferably operated by the same dial knob and relatively oriented so that one increases its capacity and the other decreases its capacity as the knob is rotated. These two condensers 35 and 36 are connected in parallel to the condensers 19—22 and 20—22 and it is thus obvious that the frequency of the two circuits can be separated or brought to equality by this single adjustment. In other words the beats between the two oscillating circuits can be readily varied or adjusted to zero value by the single adjustment of the knob controlling the small condensers 35 and 36. The two oscillating tube circuits contain small regenerative pick-up coils 37 and 38 and a C battery 39 in accordance with standard practice. A coil 40 is inductively coupled with the inductance coils 32 and 33 of each circuit and the voltages pick-up of this coil 40 actuates the grid of the detector tube 41, the plate circuit of which carries the primary 42 of an audio-transformer 43, the secondary 44 of which may be connected to a phone, or to a galvanometer if desired.

It is obvious that the higher the frequency of the two oscillatory circuits the less differential capacity change in the condensers 19—22 and 20—22 is required to produce a change in the beat frequency, and as a result the sensitivity is increased as the frequency of the two oscillatory circuits is increased.

In place of the differential scheme, wherein the sound waves produce an increase in frequency in one oscillatory circuit and a corresponding decrease in frequency in the other oscillatory circuit to give beats, one oscillatory circuit can be made independent of the sound detector and maintained at a fixed frequency by a piezo-electric control or otherwise, and the other oscillatory circuit which contains a condenser such as 19—22 or 20—22 made to beat with it through a detector tube circuit as described.

In Fig. 4 I have shown a schematic wiring diagram of apparatus connected as proposed in the preceding paragraph in which a piezo-electric crystal 46 is adapted to control and maintain a steady or constant frequency of an oscillator 47. A variable condenser 48 serves to tune the plate circuit of the oscillator 47 to the frequency of the crystal 46. A second oscillator 49 has its frequency determined by a small variable condenser 50 and also by the variable capacity of a condenser 51, the capacity of this latter condenser being variable in response to sound waves or ground vibrations. The plate 52 of the condenser 51 may be an inertia element similar to the element 22 of Fig. 1 while the plate 53 corresponds to either one of the ring-shaped plates 19 or 20 of Fig. 1. In Fig. 4 the inductances 32′, 33′, 37′, 38′ and 40′ and the C battery 39′ correspond respectively to the inductances 32, 33, 37, 38 and 40 and C battery 39 of the circuit shown in Fig. 3. A coil 40′ is inductively coupled with the inductance coils 32′ and 33′ connected respectively in circuit with the crystal-controlled oscillator 47 and the oscillator 49 the frequency of which varies in response to changes in capacity of the condenser 51, and the voltage of this coil 40' actuates the grid of a detector tube 41', the plate circuit of which carries the primary 42' of an audio-transformer 43', the secondary 44' of which may be connected to a phone, or to a galvanometer if desired in a manner similar to that heretofore described with reference to Fig. 3. An advantage derived in an arrangement of this kind through the use of a constant frequency combined with a frequency varied by the sound detecting device lies in the fact that less shielding difficulties will be presented.

It would also be possible to carry out the method with but two tubes, one in each oscillatory circuit but employing one of the tubes as both an oscillator and a detector as in autodyne radio reception.

While I have described my invention as embodied in concrete form and operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

The invention described herein may be manufactured and used by or for the Government of the United States for governmental purposes without the payment to me of any royalty thereon.

I claim:

1. In a vibration detecting device, a casing adapted to be responsive to vibrations, a pair of metallic plates provided with openings in their centers, electrically insulating means for rigidly supporting said plates within said casing in parallel planes, a metallic inertia member having a disc-like portion and a pair of hub portions, means for resiliently supporting said inertia member in a position such that said disc-like portion will be between and normally equidistant from said plates, said resilient means being attached to said hub portions projecting through the openings in said plates.

2. In a vibration detecting device, a casing adapted to be anchored in a medium and responsive to vibrations in said medium, an electrically insulating member rigidly affixed to and within said casing, a pair of metallic plates secured to said insulating member in parallel horizontal planes, said plates being provided with aligned center openings, a metallic disc-shaped inertia member, a pair of hubs on said inertia member, resilient means for supporting said inertia member horizontally between and normally equidistant from said condenser plates, said resilient means being attached to said insulating member and to the hubs on said inertia member, said hubs projecting through the openings in said condenser plates, and electrical connections leading from said plates and said inertia member.

3. In a vibration detector, a casing adapted to be anchored in the ground in intimate contact therewith, an annular insulating member secured to and within said casing, said insulating member having an inwardly extending flange, a pair of metallic plates secured to and projecting inwardly from said insulating member at opposite sides of said flange, a metallic inertia element having a disc-shaped portion, resilient means attached to said insulating member and to said inertia element for supporting the disc-shaped portion of said inertia element substantially midway between said plates so that a pair of electrical condensers are formed, one condenser comprising the disc-shaped portion of said inertia element and one of said plates and the other condenser comprising said disc-shaped portion and the other of said plates.

4. In a vibration detector, a casing adapted to be anchored in the ground so as to be responsive to ground vibrations, a pair of electrically conductive ring-shaped plates, electrically insulating means for rigidly securing said plates to said casing in parallel relation with each other, an electrically conductive inertia disc having a pair of hub portions, a pair of flexible diaphragms supported by said insulating means and connected at their centers to said hub portions, the arrangement being such that said inertia disc is resiliently suspended substantially midway between said ring-shaped plates, said hub portions projecting through the openings in said ring-shaped plates.

5. In a vibration detecting device, a casing responsive to vibrations, a pair of metallic plates, one of said plates being provided with a center opening, electrically insulating means for supporting said plates within said casing in parallel horizontal planes, a metallic inertia member having a disc-like portion and a hub portion, flexible means attached to said hub portion for resiliently supporting said inertia member in a position such that said disc-like portion will be between and normally equidistant from said plates, the hub portion of said inertia member projecting through the opening in one of said plates.

HARVEY C. HAYES.